(12) United States Patent
Borgerson et al.

(10) Patent No.: US 7,669,497 B2
(45) Date of Patent: Mar. 2, 2010

(54) POWERTRAIN WITH TORQUE CONVERTER AND AXIALLY COMPACT SEVEN SPEED DUAL CLUTCH TRANSMISSION

(75) Inventors: James B. Borgerson, Ann Arbor, MI (US); Simon P. Fitzgerald, Glenwood (AU)

(73) Assignee: GM Global Technology Operations, INC., Detroit, MI (US)

( * ) Notice: Subject to any disclaimer, the term of this patent is extended or adjusted under 35 U.S.C. 154(b) by 617 days.

(21) Appl. No.: 11/466,479

(22) Filed: Aug. 23, 2006

(65) Prior Publication Data

US 2008/0047378 A1 Feb. 28, 2008

(51) Int. Cl.
*F16H 3/38* (2006.01)

(52) U.S. Cl. .............................. 74/340; 74/329; 74/331

(58) Field of Classification Search ........... 74/329–331, 74/340
See application file for complete search history.

(56) References Cited

U.S. PATENT DOCUMENTS

| 5,188,575 A * | 2/1993 | Leising et al. ............... 475/280 |
| 2005/0000307 A1* | 1/2005 | Gumpoltsberger ........... 74/331 |
| 2005/0252325 A1 | 11/2005 | Stevenson |

* cited by examiner

*Primary Examiner*—David D Le
*Assistant Examiner*—Derek D Knight
(74) *Attorney, Agent, or Firm*—Quinn Law Group, PLLC

(57) ABSTRACT

A powertrain having a torque converter, friction input shifting clutches and shared driving gears has an axially compact design, packages a transmission pump between the torque converter and a clutch hub and achieves seven forward speed ratios utilizing four back-to-back synchronizers.

13 Claims, 2 Drawing Sheets

| Gear | Friction Clutches | | Back-to-Back Synchro A | | Back-to-Back Synchro B | | Back-to-Back Synchro C | | Back-to-Back Synchro D | |
|---|---|---|---|---|---|---|---|---|---|---|
| | CO | CE | A1 | A3 | B2 | BR | C5 | C7 | D6 | D4 |
| Rev | | X | | | | X | | | | |
| N | | | | | | | | | | |
| 1st | X | | X | | | | | | | |
| 2nd | | X | | | X | | | | | |
| 3rd | X | | | X | | | | | | |
| 4th | | X | | | | | | | | X |
| 5th | X | | | | | | X | | | |
| 6th | | X | | | | | | | X | |
| 7th | X | | | | | | | X | | |

# POWERTRAIN WITH TORQUE CONVERTER AND AXIALLY COMPACT SEVEN SPEED DUAL CLUTCH TRANSMISSION

TECHNICAL FIELD

The invention relates to a powertrain having a power source, a torque converter and a compact seven speed transmission with two friction shifting clutches.

BACKGROUND OF THE INVENTION

Dual clutch transmissions (DCTs) have been designed with friction launch clutches that connect a vehicle power source such as an engine to a lay shaft transmission. Dual clutch transmissions are known for their sporty, performance-oriented characteristics. Dual clutch transmissions typically exhibit good fuel economy due to good gear mesh efficiency and ratio selection flexibility. Synchronizers are typically used to engage gears with the countershafts to complete power flow from the engaged input clutch to an output shaft. The synchronizers have low spin losses; thus, overall operating efficiency is enhanced. However, dual clutch transmissions have some specific design considerations. For example, due to the high heat that can be generated during slip, the shifting clutches must be of a relatively large size and shudder and oil life durability must be addressed. Additionally, cooling circuits for the friction shifting clutches are typically relatively complex due to the heat dissipation requirements of these large clutches. Finally, because lay shaft or countershaft transmissions typically have many sets of axially-aligned, intermeshing gears, overall axial length of countershaft transmissions may limit there use in some vehicle designs.

SUMMARY OF THE INVENTION

A powertrain having a torque converter and dual shifting friction clutches connectable to first and second concentric intermediate shafts combines the smoothness and ratio-boosting effects of a torque converter with the low spin losses associated with synchronizers used in dual clutch designs, while preferably providing seven fixed forward speed ratios in an axially compact design. Several aspects of the powertrain contribute to the minimization of axial length. For example, driving gears connected for common rotation with the intermediate shafts intermesh with driven input gears connectable for rotation with each of the respective countershafts, thus functioning as shared driving gears. Preferably, back-to-back synchronizer pairs are supported on the countershafts between adjacent intermeshing aligned gear sets such that only four back-to-back synchronizer pairs are necessary and only four synchronizer selection devices are required to control engagement of the four pairs. Additionally, a parking gear is preferably connected for common rotation with one of the countershafts such that it is radially-aligned with an intermeshing output gear set. (A radial plane is in a plane encompassing radii of the driving or driven gears, perpendicular to the axis of rotation of the input member, output member, intermediate shafts and countershafts in the transmission. Accordingly, as used herein, components that are "radially-aligned" are aligned in a radial plane.) Furthermore, positioning of a transmission oil pump between the torque converter and the first and second friction shifting clutches allows a clutch hub supporting the friction shifting clutches to be configured with clutch hub passages for routing oil delivered from the pump to the friction shifting clutches.

Specifically, within the scope of the invention, the powertrain includes a power source and a torque converter that operatively connects the power source with a transmission input member. First and second friction shifting clutches are alternately selectively engagable to operatively connect the transmission input member with first and second concentric intermediate shafts, respectively. A first input driving gear is connected for common rotation with the first intermediate shaft and intermeshes with a first pair of driven input gears that are each connectable for common rotation to a different respective one of the countershafts to selectively transfer torque to the respective countershaft when the first friction input clutch is engaged. Furthermore, a second input driving gear is connected for common rotation with the second intermediate shaft and intermeshes with a second pair of input gears each connectable for common rotation with a different respective one of the countershafts to selectively transfer torque to the respective countershaft when the second friction input clutch is engaged. Thus, when torque is provided through either of the friction clutches to the countershafts, shared driving gears on each of the countershafts transfer the torque to one of the countershafts, depending on synchronizer engagements. Preferably, the first countershaft includes two input driving gears and the second countershaft has two other input driving gears so that four intermeshing aligned gear sets are used for input of torque from the first and second friction shifting clutches. Preferably two output gear sets are utilized, including a first output gear set that has a first output driving gear connected for common rotation with the first countershaft and a first output driven gear connected for common rotation with the output member that continuously intermeshes with the first output driving gear. Similarly, the second output gear set has a second output driving gear connected for common rotation with a second countershaft and a second output driven gear connected for common rotation with the output member that continuously intermeshes with the second output driving gear. Accordingly, the input and output driving gears and the input and output driven gears thereby form six sets of intermeshing aligned gears. By utilizing the four back-to-back synchronizers and selectively engaging the friction shifting clutches, seven forward speed ratios and a reverse speed ratio are achieved.

Unique packaging of the transmission oil pump allows simplified routing of clutch and lubrication oil and compact piloting of a clutch hub that supports the dual friction shifting clutches. Specifically, the clutch hub is configured with clutch hub passages for routing oil delivered from the transmission oil pump to the first and second friction shifting clutches. Preferably, a stationary clutch hub support member at least partially supports the clutch hub and is configured with clutch hub support member passages that are in fluid communication with the clutch hub passages so that oil may be routed from the transmission oil pump to the friction shifting clutches through the stationary clutch hub support member. The transmission oil pump is preferably radially-inward of and partially surrounded by the stationary clutch hub support member. Preferably, a stator support shaft connects a stator portion of the torque converter with the clutch hub support member. The oil pump is positioned radially-outward of the stator support shaft. Preferably the stator support shaft is configured with stator support shaft passages that are in fluid communication with the oil pump to route oil delivered from the oil pump to the torque converter.

The above features and advantages and other features and advantages of the present invention are readily apparent from

DESCRIPTION OF THE PREFERRED EMBODIMENT

Figure 1:
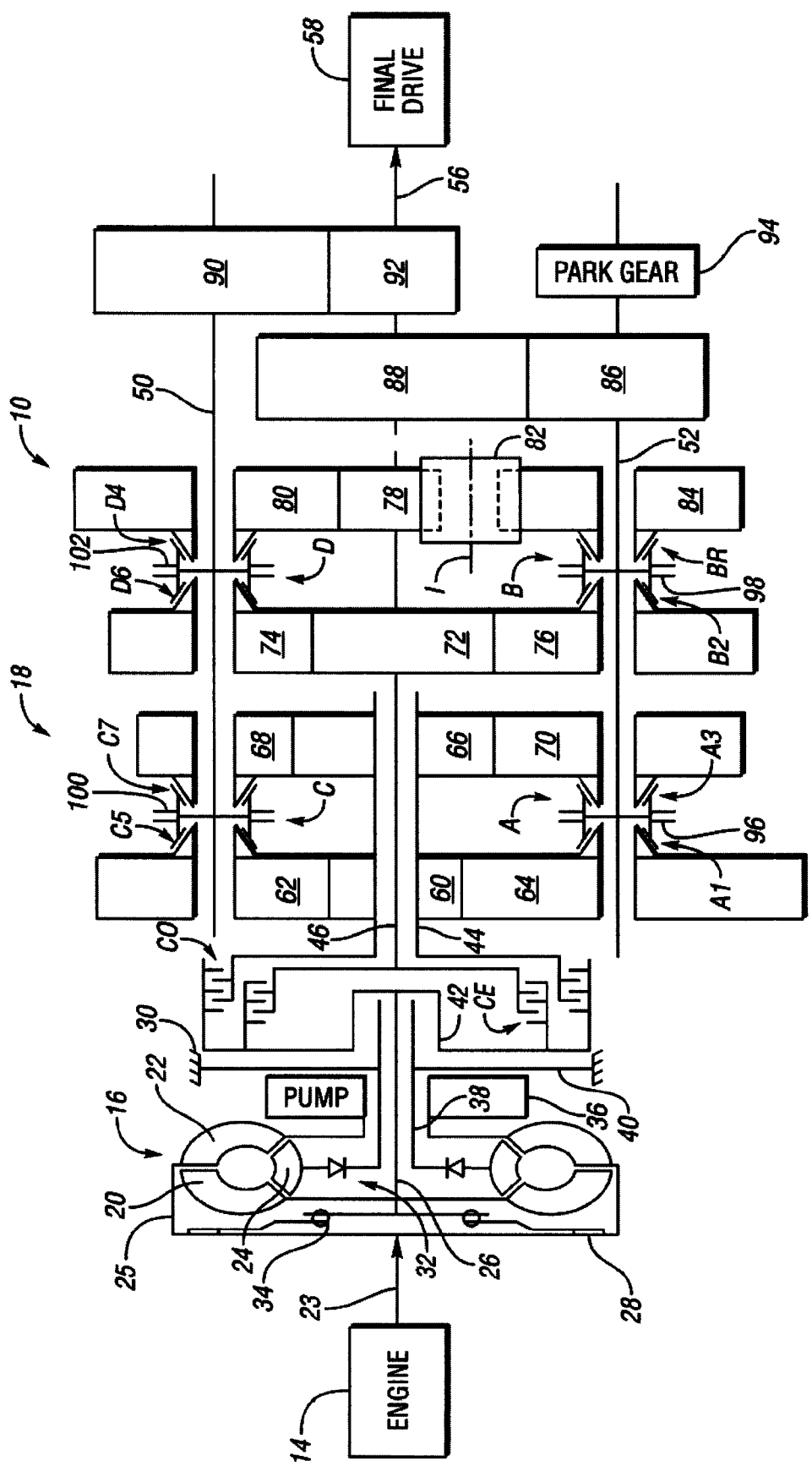
FIG. 1 is a schematic illustration of a first embodiment of a powertrain with an engine, a torque converter, a transmission with dual friction shifting clutches, and an oil pump positioned between the torque converter and the friction shifting clutches.

Referring to the drawings, wherein like reference numbers represent the same or corresponding parts throughout the several views, there is shown in FIG. 1 a powertrain 10 for a vehicle (not shown). The powertrain 10 includes a power source or engine 14, a torque converter 16 and a transmission 18. The torque converter 16 includes a turbine portion 20, a pump portion 22, and a stator portion 24. An engine output shaft 23 is connected for rotation with a hub member 25 that is connected to the pump portion 22. The turbine portion 20 is connected with a transmission input member 26. A fluid coupling between the pump portion 22 and the turbine portion 20 thus operatively connects the engine 14 with the transmission input member 26. The transmission input member 26 is preferably in the nature of a shaft. Selective engagement of a torque converter clutch 28 allows the engine 14 to be directly connected with the input member 26, bypassing the torque converter 16. Preferably, the torque converter clutch 28 is electronically controlled and may be enhanced with the multitude of clutch plates to provide a large clutch torque capacity, thus making the converter clutch 28 able to transmit a large amount of torque. The stator portion 24 is grounded to a stationary member, such as the transmission housing 30, through a typical one-way clutch 32. A damper 34 is operatively connected to the torque converter clutch 28 for absorbing vibration. A transmission oil pump 36 is operatively connected for rotation with the pump portion 22. Support for the pump 36 and fluid communication from the pump 36 to the transmission 18 and to the torque converter 16 will be discussed hereinafter. Briefly, a stator support shaft 38 supports the stator and is located radially-inward of the pump 36. The stator support shaft 38 operatively supports the stator portion 24 and is connected with a stationary clutch hub support member 40 that is grounded to the transmission housing 30. A clutch hub 42 operatively connects the input member 26 with first and second concentric intermediate shafts 44, 46 by selective engagement of first and second friction shifting clutches CO and CE, respectively.

The transmission 18 further includes countershafts 50 and 52 which are axially-spaced from and generally parallel with the intermediate shafts 44 and 46.

Six aligned, intermeshing gear sets are utilized to transfer torque from the intermediate shafts 44, 46 via the countershafts 50, 52 to an output member 56 (preferably in the form of a shaft) to establish multiple speed ratios between the input member 26 and the output member 56. The output member 56 is connected to a final drive mechanism 58 which may be connected to vehicle wheels (not shown).

A first intermeshing gear set includes gears 60, 62 and 64. Gear 60 is a shared input driving gear that is connected for common rotation with intermediate shaft 44 and continuously intermeshes with both gears 62 and 64. Gear 62 is rotatable about countershaft 50 and is selectively connectable therewith. Gear 64 is rotatable about countershaft 52 and is selectively connectable therewith. A second intermeshing gear set includes gears 66, 68 and 70. Gear 66 is connected for common rotation with intermediate shaft 44 and continuously intermeshes with both gears 68 and 70. Gear 68 is rotatable about and selectively connectable with countershaft 50. Gear 70 is rotatable about and selectively connectable with countershaft 52. A third intermeshing gear set includes gears 72, 74 and 76. Gear 72 is connected for common rotation with intermediate shaft 46 and continuously intermeshes with both gears 74 and 76. Gear 74 is rotatable about and selectively connectable for rotation with countershaft 50. Gear 76 is rotatable about and selectively connectable for rotation with countershaft 52. A fourth intermeshing gear set includes gear 78, gear 80, gear 82, and gear 84. Gear 78 is connected for common rotation with intermediate shaft 46. Gear 78 continuously intermeshes with both gear 80 and gear 82. Gear 82 continuously intermeshes with gear 84. Gear 80 is rotatable about and selectively connectable for common rotation with countershaft 50. Gear 82 is an idler gear supported on a separate axis I. Gear 84 is rotatable about and selectively connectable with countershaft 52. Gears 60, 66, 72 and 78 are referred to herein as input driving gears. Gears 62, 64, 68, 70, 74, 76, 80, and 84 are referred to herein as input driven gears.

The transmission includes a fifth intermeshing, aligned gear set that includes gear 86 and gear 88. Gear 86 is connected for common rotation with countershaft 52 and continuously intermeshes with gear 88 which is connected for common rotation with output member 56. A sixth intermeshing, aligned gear set includes gear 90 which is connected for common rotation with countershaft 50 and gear 92 which is connected for common rotation with output member 56 and continuously intermeshes with gear 90. Gears 86 and 90 are referred to herein as output driving gears and gears 88 and 92 are referred to herein as output driven gears. The intermeshing, aligned gear set including gears 60, 62 and 64 may be referred to as a first input gear set. The intermeshing, aligned gear set including gears 66, 68 and 70 may be referred to as a second input gear set. The intermeshing, aligned gear set including gears 72, 74 and 76 may be referred to a third input gear set. The intermeshing, aligned gear set 78, 80, 82 and 84 may be referred to herein as fourth intermeshing gear set. The gear set including gears 90, 92 may be referred to as a first output gear set and the gear set including gears 88 and 86 may be referred to as a second output gear set. The four input gear sets utilize shared input driving gears: gear 60, gear 66, gear 72 and gear 78. Each of the input driving gears 60, 66, 72 and 78 intermesh with gears that are connectable for rotation with each of the countershafts 50, 52. Thus, the shared input driving gears are each able to transfer torque to both of the countershafts, the countershaft to which torque is transferred being dependent on the engagement of synchronizers, as will be described herein.

A parking gear 94 is radially-aligned with the output gear set 90, 92. Thus, the parking gear 94 is situated in what may otherwise be unused, empty space and does not require any addition to the axial length of the transmission 18.

The transmission 18 includes four pairs of back-to-back synchronizers: A, B, C and D. Back-to-back synchronizer pair A includes synchronizer A1 and synchronizer A3. Synchronizer A1 is selectively engagable to connect gear 64 for common rotation with countershaft 52. Synchronizer A3 is selectively engagable to connect gear 70 for common rotation with countershaft 52. A single synchronizer selection device 96 is operable to engage either synchronizer A1 or A3. Specifically, synchronizer selection device 96 is shiftable to the left to engage synchronizer A1 and shiftable to the right the engage synchronizer A3.

Back-to-back synchronizer pair B includes synchronizers B2 and BR. Synchronizer B2 is selectively engagable to connect gear 76 for common rotation with countershaft 52. Synchronizer BR is selectively engagable to connect gear 84 for common rotation with countershaft 52. A single synchronizer selection device 98 is operable to control engagement of both synchronizer B2 and synchronizer BR. Specifically, synchronizer selection device 98 is shiftable to the left to engage synchronizer B2 and shiftable to the right to engage synchronizer BR.

Back-to-back synchronizer pair C includes synchronizer C5 and synchronizer C7. Synchronizer C5 is selectively engagable to connect gear 62 for common rotation with the countershaft 50. Synchronizer C7 is selectively to connect gear 68 for common rotation with countershaft 50. A single synchronizer selection device 100 is operable to control engagement of both the synchronizers C5 and C7. Specifically, synchronizer selection device 100 is shiftable to the left to engage synchronizer C5 and shiftable to the right the engage synchronizer C7.

Back-to-back synchronizer pair D includes synchronizer D6 and synchronizer D4. Synchronizer D6 is selectively engagable to connect gear 74 for common rotation with countershaft 50. Synchronizer D4 is selectively engagable to connect gear 80 for common rotation with countershaft 50. A single synchronizer selection device 102 is operable to control engagement of both synchronizers D6 and D4. Specifically, synchronizer selection device 102 is shiftable to the left to engage synchronizer D6 and shiftable to the right to engage synchronizer D4.

Figures 2, 3:
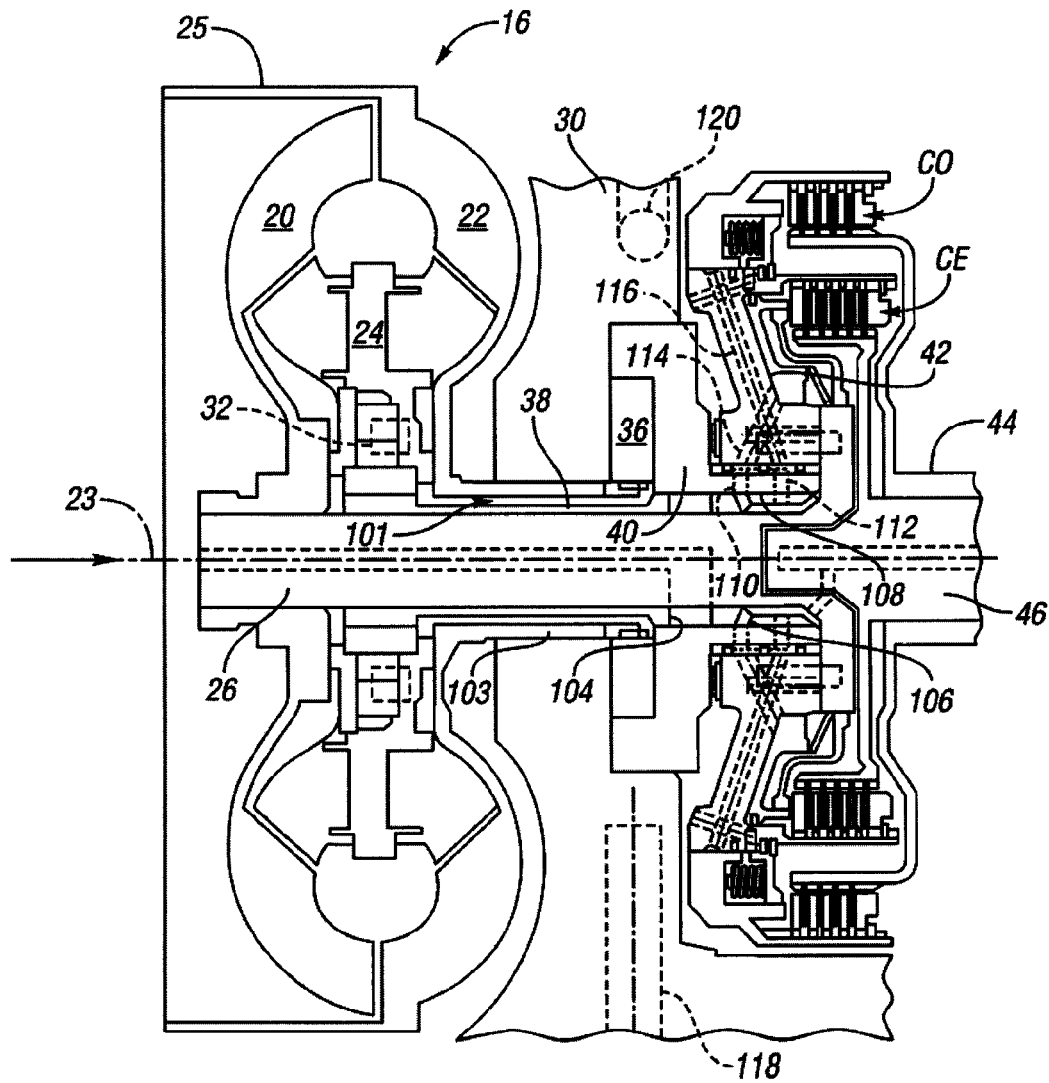
FIG. 2 is a table showing an engagement schedule of the friction shifting clutches and synchronizers in the powertrain of FIG. 1 to achieve seven forward speed ratios and a reverse speed ratio.
FIG. 3 is a partial schematic fragmentary illustration of the torque converter, oil pump and friction shifting clutches of the powertrain of FIG. 1, showing a clutch hub, a clutch hub support member and a stator shaft support member that enable routing of oil from the oil pump to the torque converter and to the friction shifting clutches.

Referring to FIG. 2, the engagement schedule of the shifting friction clutches CO and CE as well as the synchronizers is shown. As indicated in FIG. 2, seven forward gears (i.e., speed ratios) and a reverse gear (i.e., speed ratio) are achieved. Those skilled in the art will recognize that the gears shown in FIG. 1 may be designed with various tooth counts that, when the clutches and synchronizers are engaged according to the truth table of FIG. 2, will result in seven forward speed ratios and a reverse speed ratio corresponding with the seven forward gears and the reverse gear. For example, the following tooth ratios may have different numerical values: tooth count gear 62/tooth count gear 60; tooth count gear 64/tooth count gear 60; tooth count gear 68/tooth count gear 66; tooth count gear 70/tooth count gear 66; tooth count gear 74/tooth count gear 72; tooth count gear 76/tooth count gear 72; tooth count gear 80/tooth count gear 78; tooth count gear 84/tooth count gear 78; tooth count gear 86/tooth count gear 88; and tooth count gear 90/tooth count gear 92. The tooth counts are selected to achieve desired speed ratios, ratio steps, and overall speed ratio.

To establish the reverse speed ratio, clutch CE and synchronizer BR are engaged. By engagement of clutch CE torque is transferred from the input member 26 to the intermediate shaft 46. By engagement of synchronizer BR torque is transferred from the intermediate shaft 44 to the countershaft 52 via intermeshing gears 78, 82 and 84, with gear 82 acting as an idler gear so that gear 84 rotates in the same direction as gear 78. Torque is transferred from countershaft 52 to output member 56 via intermeshing gears 86 and 88.

To establish the first forward speed ratio, input friction clutch CO and synchronizer A1 are engaged. Torque is transferred from the input member 26 to intermediate shaft 44 via engagement of input shifting friction clutch CO. Torque is transferred from intermediate shaft 44 to countershaft 52 by engagement of synchronizer A1 through intermeshing gears 60 and 62. Torque is transferred from countershaft 52 to output member 56 via intermeshing gears 86 and 88.

To establish the second forward speed ratio, input friction shifting clutch CE and synchronizer B2 are engaged. Torque is transferred from input member 26 to intermediate shaft 46 via engagement of clutch CE. Torque is then transferred from intermediate shaft 46 to countershaft 52 via engagement of synchronizer B2 through intermeshing gears 72 and 76. Torque is transferred from countershaft 52 to output member 56 via intermeshing gears 86 and 88.

To establish the third forward speed ratio, input friction shifting clutch CO and synchronizer A3 are engaged. Torque is transferred from input member 26 to intermediate shaft 44 via engagement of clutch CO. Torque is transferred from intermediate shaft 44 to countershaft 52 via engagement of synchronizer A3 through intermeshing gears 66 and 70. Torque is transferred from countershaft 52 to output member 56 via intermeshing gears 86 and 88.

To establish the fourth forward speed ratio, input friction shifting clutch CE and synchronizer D4 are engaged. Torque is transferred from input member 26 to the intermediate shaft 46 via engagement of clutch CE. Torque is transferred from intermediate shaft 46 to countershaft 50 via engagement of synchronizer D4 through intermeshing gears 78 and 80. Torque is transferred from countershaft 50 to output member 56 through intermeshing gears 90 and 92.

A fifth forward speed ratio is established by engagement of input friction shifting clutch CO and synchronizer C5. Torque is transferred from input member 26 to intermediate shaft 44 via engagement of clutch CO. Torque is transferred from intermediate shaft 44 to countershaft 50 via engagement of synchronizer C5 through intermeshing gears 60 and 62. Torque is transferred from countershaft 50 to output member 56 through intermeshing gears 90 and 92.

A sixth forward speed ratio is established by engagement of input friction shifting clutch CE and synchronizer D6. Torque is transferred from input member 26 to intermediate shaft 46 via engagement of clutch CE. Torque is transferred from intermediate shaft 46 to countershaft 50 via engagement of synchronizer D6 through intermeshing gears 72 and 74. Torque is transferred from countershaft 50 to output member 56 through intermeshing gears 90 and 92.

A seventh forward speed ratio is established via engagement of input friction shifting clutch CO and synchronizer C7. Torque is transferred from input member 26 to intermediate shaft 44 via engagement of input friction shifting clutch CO. Torque is transferred from intermediate shaft 44 to countershaft 50 via engagement of synchronizer C7 through intermeshing gears 66 and 68. Torque is transferred from countershaft 52 to output member 56 through intermeshing gears 90 and 92.

Referring to FIG. 3, torque converter 16, pump 36, stationary clutch hub support member 40, clutch hub 42 and stator support shaft 38 are shown in greater detail. The transmission oil pump 36 is operatively connected to the pump portion 22 of the torque converter 16 and to the engine output member 23 via pump portion hub member 25. The stator portion 24 is operatively connected to stator support shaft 38 which is connected with stationary clutch hub support member 40. The transmission housing 30 is bolted or otherwise connected with the stationary member clutch hub support member 40. Thus, the pump 36 is radially-outward of the stator support shaft 38 and is radially-inward of and supported by the stationary clutch hub support member 40.

Turbine portion 20 is operatively connected for rotation with the input member 26. Input member 26 in turn is operatively connected for rotation with clutch hub 42. Clutch hub 42 supports a portion of the friction input shifting clutches CO and CE. Friction input shifting clutch CO has another portion operatively connected for rotation with intermediate shaft 44. Friction input shifting clutch CE has another portion operatively connected for rotation with intermediate shaft 46. Engagement of clutch CO connects the input member 26 and clutch hub 42 for rotation with intermediate shaft 44. Engagement of clutch CE connects the input member 26 and clutch hub 42 for rotation with intermediate shaft 46.

Transmission oil from pump 36 is routed to the torque converter 16 and to the friction shifting clutches CO and CE. Torque converter clutch apply oil is routed from the pump 36 to the torque converter 16 via a sleeve passage 101 which is an annular passage between the pump portion sleeve shaft 103 and the stator support shaft 38. The pump portion sleeve shaft 103 operatively connects the pump portion 22 to the pump 36. Torque converter clutch release oil is also routed to the torque converter 16 through stator support shaft passage 104 in the stator support shaft 38. The oil makes its way from the pump 36 to the stator support shaft passage 104 through the horizontally running crevice 108 between the stationary clutch hub support member 40 and the stator support shaft 38. Lubrication oil for gears supported on intermediate shafts 44 and 46 is delivered via lubrication passage 106.

The stationary clutch hub support member 40 also has clutch hub support member passages 110 and 112 formed therein to direct clutch apply oil from the pump 36 via the horizontal crevice 108 to clutch hub passages 114 and 116. The clutch hub 42 also has additional passages (not shown) in fluid communication with one another for delivering dam oil to the clutches CO and CE. These additional dam oil passages are located in a different radial plane than passages 114 and 116. Clutch hub passage 114 directs oil to the input friction clutch CE and clutch hub passage 116 directs oil to the input friction clutch CO.

Passage 118 is an oil supply to pump 36 in housing 30 and is fluidly communicable with a filter (not shown) through which oil is supplied to the pump 36. Multiple valves, represented by valve 120, control oil flow through passages 101, 104, 106, 108, 110, 112, 114 and 116 and communicate with one or more valve bodies (not shown).

Thus, the unique packaging of the oil pump 36 adjacent the clutch hub 42 enables a relatively simple cooling circuit for the friction shifting clutches CO and CE through the stationary clutch hub support member passages 110, 112 and the clutch hub passages 114, 116. During assembly of the transmission 18, the clutch hub 42 is piloted over the stationary hub support member 40, which serves to partially support both the clutch hub 42 and the pump 36.

While the best modes for carrying out the invention have been described in detail, those familiar with the art to which this invention relates will recognize various alternative designs and embodiments for practicing the invention within the scope of the appended claims.

The invention claimed is:

1. A powertrain comprising:
a power source;
a transmission input member;
a torque converter operatively connecting said power source and said transmission input member;
first and second concentric intermediate shafts;
first and second friction shifting clutches alternately selectively engagable for operatively connecting said transmission input member with said first and second intermediate shafts, respectively,
first and second countershafts;
a first input driving gear connected for common rotation with said first intermediate shaft and intermeshing with a first pair of driven input gears each connectable for rotation with a different respective one of said countershafts for selectively transferring torque to said different respective one of said countershafts when said first friction shifting clutch is engaged;
a second input driving gear connected for common rotation with said second intermediate shaft and intermeshing with a second pair of driven input gears each connectable for common rotation with a different respective one of said countershafts for selectively transferring torque to said different respective one of said countershafts when said second friction shifting clutch is engaged;
a third input driving gear connected for common rotation with said first intermediate shaft and continuously operatively connected with a third set of driven input gears each connectable for common rotation with a different respective one of said countershafts for selectively transferring torque to said different respective one of said countershafts when said first friction shifting clutch is engaged; and
a fourth input driving gear connected for common rotation with said second intermediate shaft and continuously operatively connected with a fourth set of driven input gears each connectable for rotation with a different respective one of said countershafts for selectively transferring torque to said different respective one of said countershafts when said second friction shifting clutch is engaged.

2. The powertrain of claim 1, further comprising:
a transmission output member;
a first output gear set having a first output driving gear connected for common rotation with said first countershaft and a first output driven gear connected for common rotation with said output member and continuously intermeshing with said first output driving gear;
a second output gear set having a second output driving gear connected for common rotation with said second countershaft and a second output driven gear connected for common rotation with said output member and continuously intermeshing with said second output driving gear;
a plurality of selectively engagable synchronizers for connecting said input driven gears for common rotation with said respective countershafts;
wherein said input and output driving gears and said input and output driven gears thereby form six sets of intermeshing aligned gears; and
wherein said transmission provides seven forward speed ratios and a reverse speed ratio by selective engagement of said friction shifting clutches and said synchronizers.

3. The powertrain of claim 2, wherein said synchronizers consist of four pairs of back-to-back synchronizers; wherein each pair of said back-to-back synchronizers is supported on one of said countershafts between different adjacent ones of said input driven gears.

4. A powertrain comprising:
a power source;
a transmission input member;
a torque converter operatively connecting said power source and said transmission input member;
first and second concentric intermediate shafts;
first and second rotatable and concentric friction shifting clutches;
a clutch hub supporting both said first and second friction shifting clutches;
wherein said first and second friction shifting clutches are alternately selectively engagable for operatively connecting said transmission input member with said first and second intermediate shafts, respectively, via said clutch hub;
first and second countershafts;
a first input driving gear connected for common rotation with said first intermediate shaft and intermeshing with a first pair of driven input gears each connectable for rotation with a different respective one of said countershafts for selectively transferring torque to said different respective one of said countershafts when said first friction shifting clutch is engaged;
a second input driving gear connected for common rotation with said second intermediate shaft and intermeshing with a second pair of driven input gears each connectable for common rotation with a different respective one of said countershafts for selectively transferring torque to said different respective one of said countershafts when said second friction shifting clutch is engaged; and
a transmission oil pump operatively connected to said torque converter; wherein said clutch hub is configured with clutch hub passages for routing oil delivered from said transmission oil pump to said first and second friction shifting clutches.

5. The powertrain of claim 4, further comprising:
a stationary clutch hub support member at least partially supporting said clutch hub and configured with clutch hub support member passages in fluid communication with said clutch hub passages for routing oil delivered from said transmission oil pump to said friction shifting clutches; and
wherein said transmission oil pump is radially inward of and partially surrounded by said stationary clutch hub support member.

6. The powertrain of claim 5, wherein said torque converter includes a stator portion, and further comprising:
a transmission housing;
a stator support shaft operatively connecting said torque converter stator portion with said clutch hub support member; and wherein said oil pump is positioned radially outward of said stator support shaft.

7. The powertrain of claim 6, wherein said stator support shaft is configured with stator support shaft passages in fluid communication with said oil pump for routing oil delivered from said oil pump to said torque converter.

8. A powertrain comprising:
a power source;
a transmission input member;
a torque converter operatively connecting said power source and said transmission input member;
a transmission output member;
first and second concentric intermediate shafts;
first and second friction shifting clutches alternately selectively engagable for operatively connecting said transmission input member with said first and second intermediate shafts, respectively,
first and second countershafts;
first, second, third and fourth input gear sets; wherein each of said input gear sets includes a first input driven gear rotatable about and selectively connectable for common rotation with said first countershaft; a second input driven gear rotatable about and selectively connectable for common rotation with said second countershaft; wherein said first and second input gear sets each include a first input driving gear connected for common rotation with said first intermediate shaft and continuously operatively connected with said respective first and second input driven gears; wherein said third and fourth input gear sets each include a second input driving gear connected for common rotation with said second intermediate shaft and continuously operatively connected with both said respective first and second input driven gears;
four pairs of synchronizers including a first pair positioned between said first and second input gear sets, wherein each synchronizer of said first pair is selectively engagable for connecting a respective one of said first driven gears of said first and second input gear sets with said first countershaft, a second pair positioned between said first and second input gear sets, wherein each synchronizer of said second pair is selectively engagable for connecting a respective one of said second input driven gears of said first and second input gear sets with said second countershaft, a third pair positioned between said third and fourth input gear sets, wherein each synchronizer of said third pair is selectively engagable for connecting a respective one of said first input driven gears of said third and fourth input gear sets with said second countershaft and a fourth pair positioned between said third and fourth input gear sets, wherein each synchronizer of said fourth pair is selectively engagable for connecting a respective one of said second input driven gears of said third and fourth input gear sets with said second countershaft; and
wherein selective engagement of said friction shifting clutches and said synchronizers provides seven forward speed ratios and a reverse speed ratio between said input member and said output member.

9. The powertrain of claim 8, further comprising:
four synchronizer selection devices each operable for controlling engagement of a respective one of said pairs of synchronizers.

10. The powertrain of claim 8, further comprising:
an output gear set having an output driving gear rotatable about and connectable for common rotation with one of said first and second countershafts and an output driven gear connected for common rotation with said output member for driving said output member via said output gear set;
a parking gear connected to the other of said first and second countershafts; and
wherein said parking gear is radially-aligned with said output gear set.

11. The powertrain of claim 4, further comprising:
a third input driving gear connected for common rotation with said first intermediate shaft and continuously operatively connected with a third set of driven input gears each connectable for common rotation with a different respective one of said countershafts for selectively transferring torque to said different respective one of said countershafts when said first friction shifting clutch is engaged; and a fourth input driving gear connected for common rotation with said second intermediate shaft and continuously operatively connected with a fourth set of driven input gears each connectable for rotation with a different respective one of said countershafts for selectively transferring torque to said different respective one of said countershafts when said second friction shifting clutch is engaged.

12. The powertrain of claim 11, further comprising:

a transmission output member;

a first output gear set having a first output driving gear connected for common rotation with said first countershaft and a first output driven gear connected for common rotation with said output member and continuously intermeshing with said first output driving gear;

a second output gear set having a second output driving gear connected for common rotation with said second countershaft and a second output driven gear connected for common rotation with said output member and continuously intermeshing with said second output driving gear;

a plurality of selectively engagable synchronizers for connecting said input driven gears for common rotation with said respective countershafts;

wherein said input and output driving gears and said input and output driven gears thereby form six sets of intermeshing aligned gears; and wherein said transmission provides seven forward speed ratios and a reverse speed ratio by selective engagement of said friction shifting clutches and said synchronizers.

13. The powertrain of claim 12, wherein said synchronizers consist of four pairs of back-to-back synchronizers; wherein each pair of said back-to-back synchronizers is supported on one of said countershafts between different adjacent ones of said input driven gears.

* * * * *